UNITED STATES PATENT OFFICE.

WILLIAM L. DUDLEY, OF COVINGTON, KENTUCKY, ASSIGNOR OF ONE-HALF TO JAMES P. WITHEROW, OF PITTSBURG, PENNSYLVANIA.

LINING FOR CONVERTERS AND FURNACES.

SPECIFICATION forming part of Letters Patent No. 350,922, dated October 19, 1886.

Application filed August 27, 1885. Serial No 175,499. (No specimens.)

*To all whom it may concern:*

Be it known that I, WILLIAM L. DUDLEY, of Covington, in the county of Kenton and State of Kentucky, have invented a new and useful Improvement in Linings for Converters and Furnaces; and I do hereby declare the following to be a full, clear, and exact description thereof.

The object of my invention is the production of a neutral lining for furnaces, hearths, converters, and other vessels used for the treatment of molten iron, as distinguished from an acid or basic lining—that is, a lining which will not be attacked either by an acid or by a base. In a vessel so lined the lining will not be wasted either by the silica in the iron or by basic additions—such as lime, &c.—which are charged for the purpose of removing the phosphorus or other impurities in the bath.

Another object of my invention is to obtain a lining capable of resisting high temperature.

My improved lining is composed of aluminium oxide and chrome or titanium iron ore. The ingredients just named are first calcined, if necessary, to drive off the water and any volatile substances which may be contained therein, and then pulverized and mixed together with a small percentage of carbonaceous matter and sufficient water to make the mass plastic; or the steps just named may be reversed in order—that is to say, the calcining may take place after the pulverizing and mixing. The carbonaceous matter used may be plumbago, pulverized charcoal or coke, molasses, or other suitable form. The plastic mass or batch thus produced may be molded into bricks and burned, to be used in the lining of furnaces; or the latter may be lined by ramming it into place in the bottom or hearth, after which the lining is dried and burned in the usual way. The proportions may be varied somewhat without departing from my invention. The carbonaceous matter is designed to effect the reduction of a portion of the ore when the heat is applied to the lining to harden the same and prevent its rapid wear by the attrition of the charge, and to cement and bind it so as to prevent its cracking or spalling with the heat.

Of the two kinds of ore mentioned, I prefer to use the chrome ore, on account of its higher refractory properties. The lining thus made is of a neutral character, and will therefore stand for a long time, and effect a large saving in the expense and trouble of relining the furnace or other vessel.

I am aware that a lining composed of chrome ore mixed with tar, petroleum, or like substance, as described in Letters Patent No. 308,984, granted to H. D. Pochin, December 9, 1884, is not new.

What I claim as my invention, and desire to secure by Letters Patent, is—

A lining for furnaces, converters, and other vessels in which molten iron is treated, consisting of about one part of aluminium oxide and about two parts of chrome or titanium iron ore, substantially as and for the purposes described.

In testimony whereof I hereunto set my hand this 25th day of August, A. D. 1885.

WILLIAM L. DUDLEY.

Witnesses:
R. H. WHITTLESEY,
THOMAS B. KERR.